Sept. 17, 1935. W. H. JOHNSON 2,014,476
SPEED CHANGE DEVICE
Filed June 4, 1932 5 Sheets-Sheet 1

INVENTOR
William H. Johnson
BY
Austin & Dix
ATTORNEYS

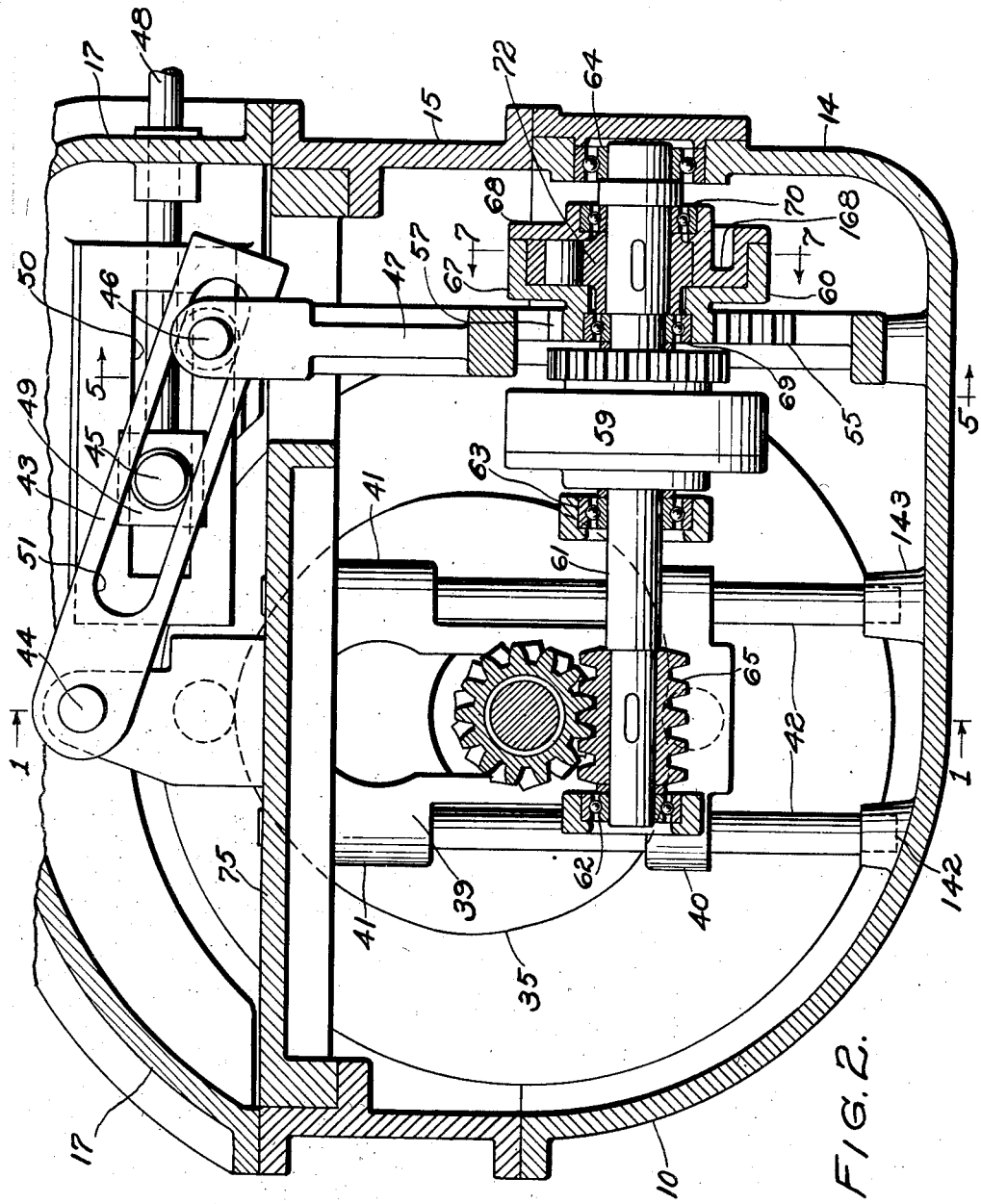

Sept. 17, 1935.  W. H. JOHNSON  2,014,476
SPEED CHANGE DEVICE
Filed June 4, 1932  5 Sheets-Sheet 3

INVENTOR
William H. Johnson
BY
Austin & Dix
ATTORNEYS

Sept. 17, 1935.  W. H. JOHNSON  2,014,476
SPEED CHANGE DEVICE
Filed June 4, 1932   5 Sheets-Sheet 4

INVENTOR
William H. Johnson
BY
Austin B. Dix
ATTORNEYS

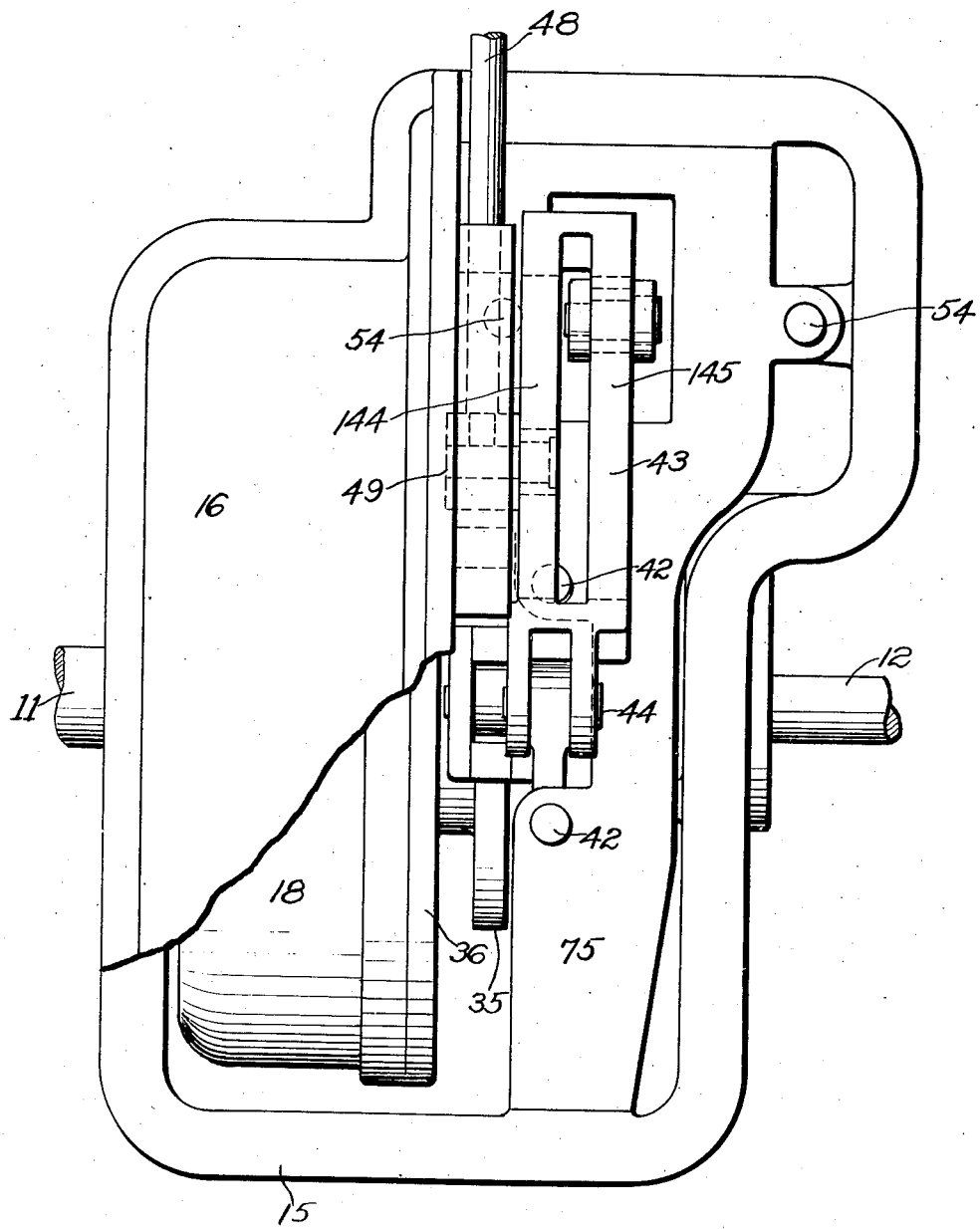

Patented Sept. 17, 1935

2,014,476

UNITED STATES PATENT OFFICE 2,014,476

SPEED CHANGE DEVICE

William Horace Johnson, Cranston, R. I., assignor to Weskenson Corporation, a corporation of Rhode Island Application June 4, 1932, Serial No. 615,301

7 Claims. (Cl. 74—283)

The invention relates to change speed mechanism.

According to the invention a change speed arrangement is provided which may be manually controlled to give any desired speed ratio between driving and driven shafts. The speed ratio may be accurately controlled by moving a single lever and the speed ratio may be changed gradually so that an infinite number of speed ratios may be obtained. The invention is capable of general application, but is particularly desirable for use with certain types of metal working machines and for automobile transmissions.

According to a preferred form of the invention a control shaft is provided by which the speed and direction of the driven shaft is determined. The drive shaft may be provided with an internal gear and the driven shaft may be provided with an external gear and the control shaft may support a plurality of pairs of pinions engaging said internal and external gears respectively.

The driving devices between the drive shaft and control shaft may comprise a heart-shaped cam mounted on the drive shaft which drives followers which in turn drive racks engaging pinions, the pinions being connected to a countershaft by one-way clutches. If desired, a worm and worm wheel may be interposed between the countershaft and control shaft. Also the system may be so arranged that for "high" or "direct" drive the control shaft and driving mechanism therefor may be stationary, thus preventing all wear on these parts at this speed.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents a longitudinal section through the speed change mechanism according to the invention taken on the line 1—1 of Fig. 2;

Fig. 2 is a section taken on the line 2—2 of Fig. 1;

Fig. 8 is a plan view, with parts broken away, of the speed change mechanism.

Figure 1:
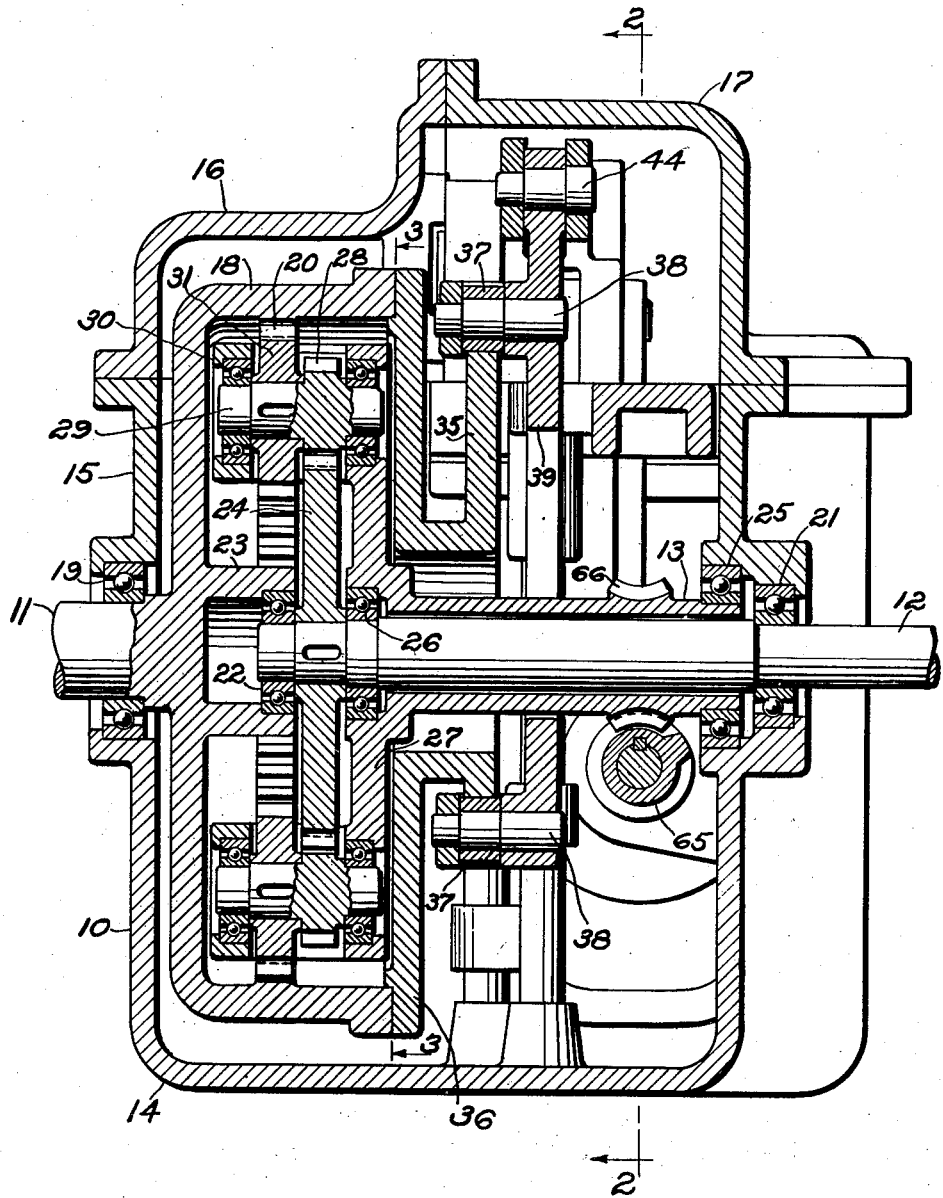

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1 and 2, the speed change mechanism comprises a casing 10 enclosing all of the parts, a drive shaft 11, a driven shaft 12 and a control shaft 13. The drive shaft may be connected to the prime mover which may be an automobile engine, in which case the driven shaft 12 will be connected to the drive wheels of the automobile. It will be understood that this mechanism may be used to drive other devices where a variable speed change is desirable, such as metal working machines, turret lathes, etc.

The casing 10 is made up of a lower section 14, an intermediate section 15 and upper sections 16 and 17. It will be understood that these sections are connected together by flanged unions in a manner well known in the art and the joints therebetween may be oil tight to prevent escape of lubricating oil with which the casing may be filled and to prevent ingress of dirt.

The drive shaft 11 is connected to flywheel 18, the flywheel being journalled in the casing sections 14 and 15 by a ball bearing 19. Secured to the flywheel 18 is an internal gear 20.

The driven shaft 12 is journalled in bearing 21 supported by the casing sections 14 and 15 and in a pilot bearing 22 supported by a hub 23 on the flywheel 18. The driven shaft 12 supports a gear 24 which is driven by the internal gear 20 through a planetary gear arrangement, the construction of which is as follows.

Surrounding the driven shaft is the control sleeve 13 by the speed of which the direction of rotation and the speed of the driven shaft 12 is determined. The control sleeve 13 is journalled in bearing 25 located between sections 14 and 15 and on bearing 26 located on the driven shaft 12.

Figure 4:
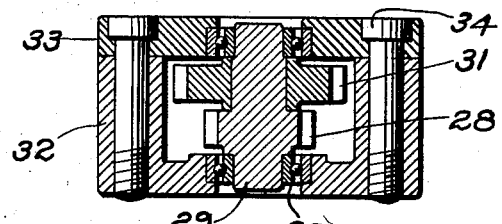
Fig. 4 is a section taken on the line 4—4 of Fig. 3.
Figure 3:
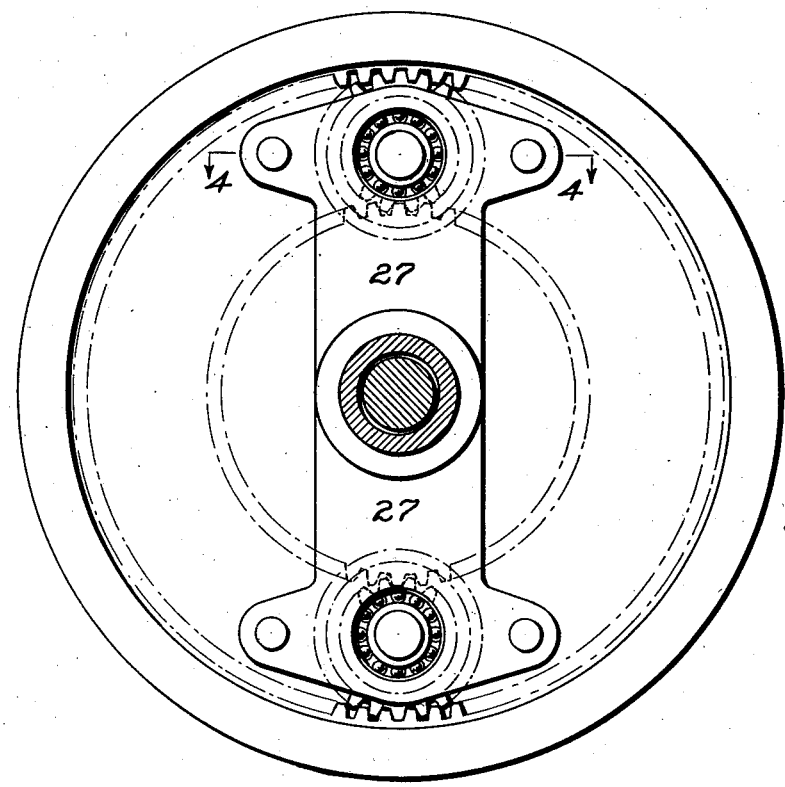
Fig. 3 is a section taken on the line 3—3 of Fig. 1.
Figure 6:
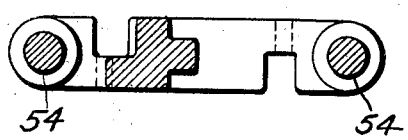
Fig. 6 is a section on the line 6—6 of Fig. 5.

Supported by the control sleeve 13 is a spider arrangement comprising a plurality of arms 27 (Fig. 3). These arms are provided with extensions 32 to which are connected plates 33 by bolts 34 (Fig. 4). Journalled in the arms 27 and plates 33 by bearings 30, are short pin shafts 29 carrying pairs of gears 28, 31. The gears 31 mesh with the internal gear 20 and the gears 28 mesh with the spur gear 24.

The control shaft 13 is driven by a heart-shaped cam 35 (Figs. 1 and 2) secured to the flywheel 18 by a circular flange 36. Located on opposite sides of the heart-shaped cam 35 are follower rollers 37 mounted on shafts 38 secured to follower yoke 39. Follower yoke 39 is provided with a pair of upper collars 41 and a pair of lower collars 40 which slide up and down on posts or ways 42 secured at one end to bosses 142 and 143 in the casing section 14, and at the other end to a flanged transverse member 75 secured to the section 15. Secured to the yoke member 39 is a working beam 43 (Fig. 8). The working beam 43 is provided with a forked end through which a pin 44 passes to pivot it to the yoke 39. The working beam 43 is provided with two sections 144 and 145.

The part 145 is provided with a slot in which is located a pivot 46 which pivots the working beam 43 to a rack member 47, as will be described hereinafter.

For controlling the throw or movement of the rack member 47 a slidable pivot 45 is provided, this pivot being slidable in a slot in the other part 144 of working beam 43. The pivot 45 is mounted on a block 49 which is slidable in a horizontal slot 50 secured to the casing section 16. A control rod 48 connects the block 49 to operating devices (not shown), the rod passing out through a hole in the casing 17. By shifting the rod 48 lengthwise, the throw of the rack member 47 may be controlled, thereby controlling the speed of the control shaft 13.

Figure 5:
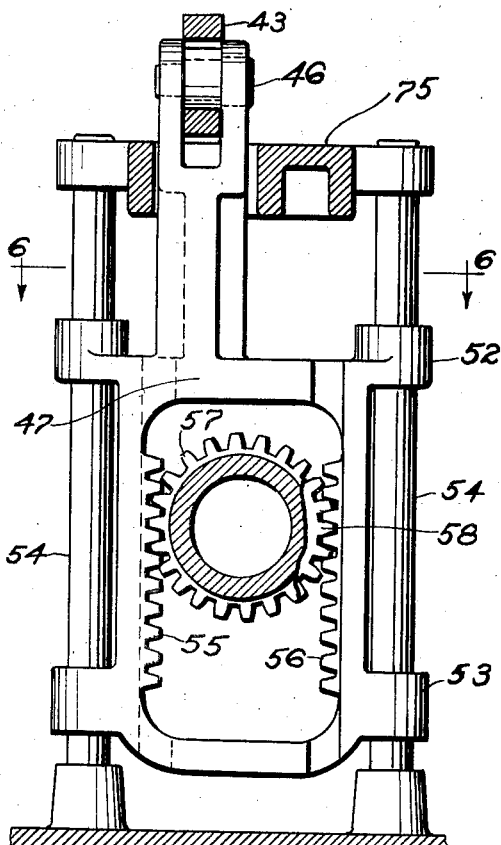
Fig. 5 is a detail taken on the line 5—5 of Fig. 2.

The rack member 47 (Fig. 5) is provided with a pair of racks 55 and 56 meshing with pinions 57 and 58 respectively. The rack member 47 is provided with collars 52 and 53 slidable on ways or posts 54 positioned between the bottom of the casing section 14 and the partition member 75. The upper end of the rack member is forked to receive the part 145 of the working beam 43.

The pinions 57 and 58 are secured to one-way clutches 59 and 60, mounted on countershaft 61. Countershaft 61 is journalled in bearings 62, 63 and 64 which are mounted on the casing section 14. Countershaft 61 supports worm 65 which meshes with worm wheel 66 mounted on control sleeve 13.

As the rotation of the heart-shaped cam 35 oscillates the rack member 47 up and down, the latter drives the pinions 57 and 58. The one-way clutches 59 and 60 are so arranged that the shaft 61 is always driven in the same direction.

The clutches 59 and 60 are disclosed for purpose of illustration as "three roll" clutches since it is known that these are very reliable in practice. It will be understood that any one-way clutch may be used. Since these clutches are similar it is only necessary to describe one in detail.

Figure 7:
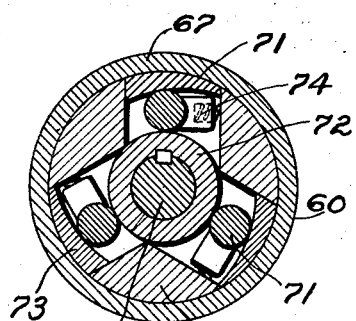
Fig. 7 is a section on the line 7—7 of Fig. 2 illustrating the construction of one of the one-way clutches.

Referring to Figs. 2 and 7, the clutch is provided with an external casing made up of parts 67 and 68. These parts are journalled on ball bearings 69 and 70 which are supported on the shaft 61.

Located within the clutch is an inner member 72 which is keyed to the shaft 61. The casing 68 has inwardly projecting portions 168 between which are located wedge members 73. Balls 71 are located between the wedge members 73 and the inner member 72. Spring pressed devices 74 are provided for wedging the balls between the wedge members 73 and the inner member 72.

It will be seen that, when the gear 57, which is attached to the casing member 67, is rotated in one direction, the casing of the clutch will merely slide over the inner clutch member 72 causing no driving force to be imparted to the shaft 61. When the gear attached to the casing member 67 is rotated in the opposite direction this will cause the rollers 71 to be tightly wedged between the wedges 73 and the inner clutch member 72 causing the driving force to be imparted to the shaft 61.

It is assumed that the drive shaft 11 will be driven at a constant speed in the same direction. This speed is assumed to be constant for purpose of illustration, but in the case of an automobile engine it is understood that it may be varied as the accelerator is operated in driving the car.

The drive shaft 11 drives the driven shaft 12 directly through the gears 20, 31, 28 and 24 (assuming the control shaft 13 to be stationary). The drive shaft 11 may also drive the racks 55 and 56 depending upon the position of the control rod 48. When the control rod 48 is in the position shown in Fig. 2, the flywheel 18, driven by the drive shaft 11, drives the heart-shaped cam 35, which in turn causes the yoke 39 to oscillate back and forth. This causes the working beam 43 to oscillate about the pivot 45, causing a corresponding reciprocating movement to be imparted to the rack member 47, driving the countershaft through the one-way clutches 59 and 60 always in the same direction. When the rack member 47 moves, say downwardly, the one-way clutch 60 drives the shaft 61, and when the rack member 47 moves upwardly, the one-way clutch 59 drives the shaft 61.

It will be noted that, when the control rod 48 moves the pivot 45 in line with the pivot 46, no motion will be imparted to the rack member 47. This means that the control shaft 13 is stationary. If desired, the gears 20, 31, 28 and 24 may be so proportioned that, when the control shaft is stationary, the drive is "direct" or "high". This is desirable in cases where direct drive is used most of the time since it saves wear on the one-way clutches and reciprocating parts.

As stated above, the direction and speed of rotation of the driven shaft is determined by the speed of rotation of the control shaft 13. This in turn is determined by the position of the control lever 48.

When no movement is imparted to the driven shaft 12, the speed change device may be said to be in "neutral". In this condition the control shaft 13 must rotate in the same direction as the drive shaft 11 at a certain speed dependent upon the ratio of the planetary gears. In the present case it may be about half the speed of the drive shaft.

Since the control shaft is stationary for direct drive and rotates at about half the speed of the drive shaft for neutral, the various grades of speed control between high and neutral will result from rotating the control shaft at speeds between zero and half the drive shaft speed in the same direction therewith.

For reverse, the control shaft may be rotated at a higher speed, say, for instance, five-eighths of the drive shaft speed in the same direction therewith. This serves to rotate the driven shaft 12 in opposite direction from the drive shaft, say at about one to four speed reduction.

The present invention has many advantages. When the control shaft 13 is stationary and the speed change device is in "high", there is no operation of the reciprocating rack member or one-way clutches, and a positive interlocking drive between driving and driven shafts is obtained. Another advantage of the invention is the obtaining of an infinite number of speed ratios from high through neutral to reverse.

A further advantage of the invention is long life due not only to the fact that the one-way clutches are not operating a large part of the time, but also by the fact that three roll clutches will stand up in use for longer periods of time. A still further advantage of the invention is the obtaining of constant speed of the driven shaft when not in high due to the employment of the heart-shaped cam which is so designed as to give constant lineal speed to the rack member 47 as it reciprocates back and forth. Another advantage of the invention is the provision of a non-reversible drive between the countershaft 61 and control shaft 13 through the worm and worm wheel 65, 66. This prevents all movement of the control shaft except under control of the rack member 47, holding the control shaft 13 absolutely stationary when in direct drive.

While certain novel features of the invention have been disclosed and are pointed out in the annexed claims, it will be understood that various omissions, substitutions and changes may be made by those skilled in the art without departing from the spirit of the invention.

What is claimed is:

1. In a speed change device, a drive shaft, a driven shaft, gearing between said shafts, a control member cooperating with said gearing, a cam driven by said drive shaft, a follower on said cam, a rack operated by said follower, a gear operated by said rack, a counter shaft, a one-way clutch between said counter shaft and gear, a worm driven by said counter shaft and a worm wheel on said control member and meshing with said worm.

2. In a speed change device, a drive shaft, a driven shaft, gearing between said shafts, a control member cooperating with said gearing, a heart shape cam driven by said drive shaft, a follower on said cam, a pair of racks operated by said follower, a pair of gears operated by said racks, a counter shaft, a pair of one-way clutches between said counter shaft and gears, a worm on said counter shaft, a worm wheel on said control member and meshing with said worm, and means for varying the amplitude of movement of said racks to vary the speed ratio between said drive and driven shaft.

3. In a speed change device, a drive shaft, a heart-shaped cam driven thereby, a follower for said cam, a pair of racks operated by said follower, gears meshing said racks respectively, a counter-shaft, one-way clutches operating in opposite directions between said gears and said counter-shaft, a driven shaft, a control shaft, gearing between said drive shaft and driven shaft under control of said control shaft, a worm wheel on said control shaft, and a worm meshing with said worm wheel and driven by said counter shaft.

4. In a speed change transmission device, a drive shaft having a gear secured thereto, a driven shaft, a control sleeve surrounding said driven shaft, a pin carried by said control sleeve and carrying gearing engaging said driven gear and said driving gear, a heart-shaped cam driven by said drive shaft, a pair of followers on opposite sides of said cam, a slide carrying said followers, a counter-shaft, a pair of gears on said counter-shaft, a one-way clutch between each gear and said counter-shaft, said clutches operating in opposite directions, a rack member having a pair of racks engaging the opposite sides of said gears respectively, a control bar having a block, ways for said block, a pivot connected to said block, a working beam having a slot engaging said pivot, said working beam also being pivoted to said follower slide and to said rack member, a worm on said counter-shaft and a worm wheel on said control sleeve, said worm wheel meshing with said worm.

5. In combination, a drive shaft, a driven shaft, a control shaft, planetary gears supported by said control shaft, gears on said drive and driven shafts meshing with said planetary gears, a cam on said drive shaft, a working beam driven by said cam, a rack driven by said working beam, a one-way clutch driven by said rack, a non-reversible drive between said clutch and said control shaft, and means for changing the fulcrum point of said working beam.

6. In a speed change device, a drive shaft, a driven shaft, gearing between said shafts, a control member cooperating with said gearing, a cam and follower mechanism driven by said drive shaft, a rack driven by said cam and follower mechanism, a pinion operated by said rack, a counter-shaft, a one-way clutch between said counter-shaft and pinion, a worm driven by said counter-shaft and a worm wheel on said control member and meshing with said worm.

7. In a speed change device, a drive shaft, an internal gear connected thereto, a driven shaft, a control shaft, a support fixedly secured to said control shaft, a driving gear on said driven shaft, a pair of gears connected to rotate together and journalled on said support, said pair of gears meshing said internal gear and said driving gear respectively, the relative number of teeth on said gears being such that said control shaft is stationary when said driven shaft rotates at the same speed as said drive shaft, a separate power transmitting path between said drive shaft and control shaft for impressing a driving torque on said control shaft, and adjustable means in said path for governing the speed ratio between said drive shaft and said control shaft.

WILLIAM H. JOHNSON.